No. 667,541. Patented Feb. 5, 1901.
J. M. LORING.
MUSICAL CHROMOSCOPE.
(Application filed May 12, 1900.)
(No Model.)
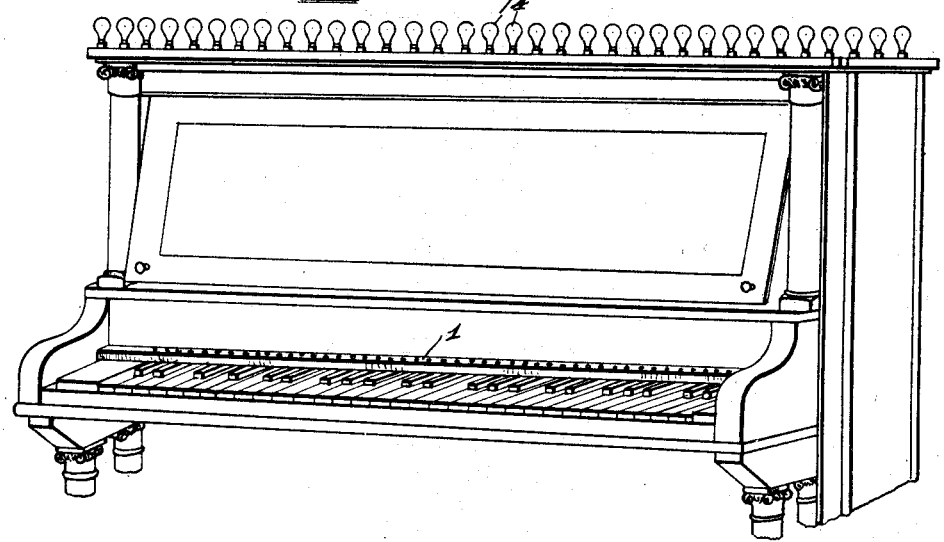
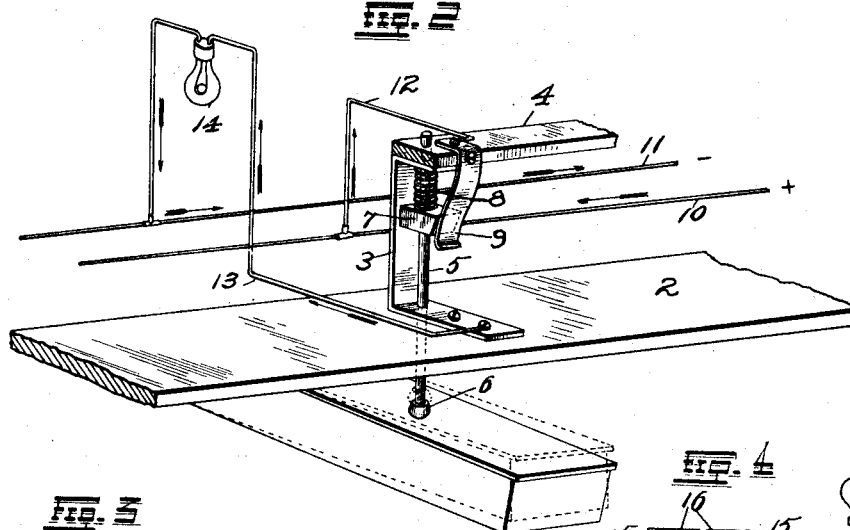
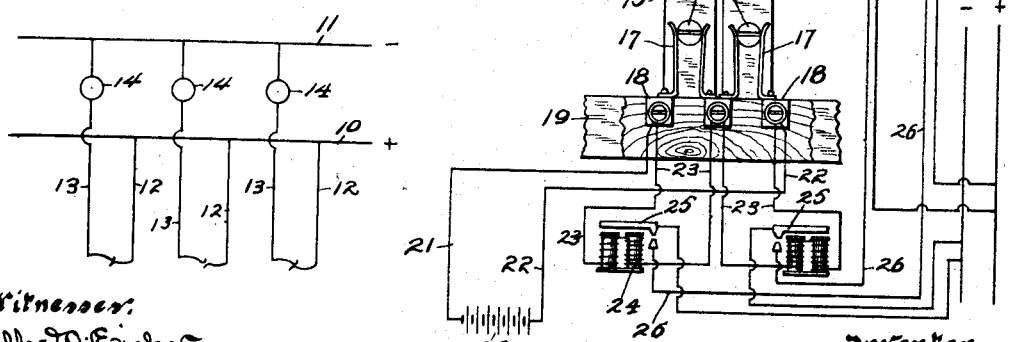
Witnesses:
Alfred A. Eicher
J. D. Rippey
Inventor,
James M. Loring,
By Higdon & Longan, Attys.

UNITED STATES PATENT OFFICE.

JAMES M. LORING, OF ST. LOUIS, MISSOURI.

MUSICAL CHROMOSCOPE.

SPECIFICATION forming part of Letters Patent No. 667,541, dated February 5, 1901.

Application filed May 12, 1900. Serial No. 16,426. (No model.)

*To all whom it may concern:*

Be it known that I, JAMES M. LORING, of the city of St. Louis, in the State of Missouri, have invented certain new and useful Improvements in Musical Chromoscopes, of which the following is a full, clear, and exact description, reference being had to the accompanying drawings, forming a part hereof.

This invention relates to chromoscopes; and it consists of the novel construction, combination, and arrangement of parts hereinafter shown, described, and claimed.

Figure 1 is a perspective of a piano to which my invention is applied. Fig. 2 is a detail diagrammatic view in perspective, illustrating the fittings of one key of the piano. Fig. 3 is a diagram of the circuit. Fig. 4 is a diagrammatic view of a modification.

The construction of this invention as shown embodies an electrical circuit for each key of the piano, organ, or other instrument to which the invention is applied. As shown in the drawings the device is attached to an ordinary upright piano, and an explanation in detail of the arrangement of the invention when in use on one instrument is sufficient to make clear its application to similar instruments.

In carrying out the invention as shown I provide a box 1 of any preferred construction, which box is mounted above the rear ends of the instrument-keys in the manner shown in Fig. 1.

2 indicates the bottom of the box, which, as shown, is at a suitable height above the instrument-keys, and to the said bottom on the inside of the box are secured guide-frames 3, there being one of the said frames for each of the instrument-keys. The upper ends of the said guide-frames are secured to the top 4 of the box, and operating within each of the said guide-frames is a rod 5, the lower ends of the said rods projecting downwardly through the bottom 2 of the box and resting upon the instrument-keys in the manner shown in Fig. 2. The lower ends of the said rods are preferably covered with a pad 6, by means of which the keys are protected from any injury which might otherwise be inflicted by the rods. The upper ends of the rods project upwardly through the top 4 of the box.

Rigidly carried by each of the rods 5 a suitable distance below the top 4 of the box 1 is a contact-block 7, the function of which is to complete the circuit when the keys are operated in a manner yet to be described. The rods are actuated downwardly by means of suitable springs 8, the said springs being mounted around the rods between the contact-blocks 7 and the top of the box.

For each of the rods 5 I provide a contact-spring 9, which springs are carried by the top 4 of the box and project downwardly and rearwardly, terminating at a point to the rear of the forward ends of the contact-blocks 7, so that when the said contact-blocks are lowered by manipulating the instrument-keys, the block 7 and spring 9 will contact with each other and complete an electrical circuit, as hereinafter described.

Leading through the box 1 are suitable electrical conductors 10 11, the conductor 10 being connected to the contact-springs 9 by means of the connections 12. The conductor 11 is connected to the lower portion of the metallic guide-frames 3 by similar connections 13, and at suitable intervals along the said connection may be placed bulbs 14 of various colors, if preferred. Thus a normally open circuit is provided which is only closed when the instrument-keys are manipulated, allowing the block 7 and the spring 9 to contact with each other, which, as is readily apparent, will complete the circuit and allow the current to run through the bulbs 14, thereby creating instantly one or more lights for each key which is manipulated. These bulbs are necessarily located exteriorly of the instrument and may be disposed over an entire room or building or stage-proscenium, if desired, thereby giving a very pleasing effect when the instrument is played. A preferred manner of disposing the lights is to arrange those of the first octave at the left of dark colors, while those on the right or treble are very brilliant and light, those between being of graduated arrangement. It is manifest that instead of using an electric lamp I may use any other common and well-known illuminating means which is capable of electrical ignition—such, for example, as gas-lamps inclosed by colored glass, flash-lights, &c.

In Fig. 4 is shown a modified arrangement of the different parts. To the rear end of each of the keys 15 is secured a metallic contact-pin 16, which in the normal position of the keys, as shown, rests between the upwardly-projecting ends of the contact-springs 17. The said contact-springs are secured to metallic blocks 18, which are supported to the rear of the keys by means of a supporting-strip 19. 20 indicates a system of constant-current batteries, leading from which is a conductor 21, the opposite end of the same being connected to one of the metallic blocks 18. When all the keys are down, the current passes through all the metallic blocks and contact-springs, which are supported to the rear of the instrument-keys, the pins 16 being the means by which the current passes from one opposite contact-spring to another, and from the metallic block 18 at the opposite end of the instrument the current passes through a conductor 22 back to the batteries. The instant, however, that the forward end of one of the keys is depressed the pin 16, carried by the rear end thereof, is removed out of contact with the springs 17 and the current will pass through a conductor 23, connected to the first metallic block 18 through which the current passes. Through the conductors 23, one of which is provided for each of the blocks 18, the current energizes the magnets 24, thereby operating the armatures 25, and completes a circuit through the conductor 26, which contacts with the armatures, and passes to the bulbs 27, disposed at suitable points about the room. This modified form is capable of as many uses as the one hereinbefore described and is fully as meritorious.

The herein-described chromoscope, comprising the electrical circuits herein described, can be attached to the piano, upright or grand, parlor or cabinet, or concert piano, or to the automatic piano, or melodeon or organ, or to any instrument with a simple keyboard without musical apparatus, or to any other suitable instrument, musical or otherwise.

The bulbs may be with parallel sides, known as the "candle" bulb, covered by a painted or stained cylinder, fitting easily over it, made of glass, isinglass, celluloid, or other transparent medium arranged in the order of the solar spectrum, preferably—as red, orange, yellow, green, blue, indigo, and violet—repeated in shades lighter as the treble is reached till all the keys are covered, known as the "chromatic scale;" or the bulbs can be arranged in any other pleasing manner. In the arrangement of the chromatic scale I provide for each C on the keyboard a red bulb; D, orange; E, yellow; F, green; G, blue; A, indigo; B, violet. However, different arrangements may be used, if preferred.

It is apparent that the mechanism may be fitted over the keyboard in front in connection with clamps or levers, by means of which the entire number of posts can be raised, so as not to come in contact with the piano-keys at all—in other words, that the attachment of electric bulbs or other illuminating means can be switched off or disconnected, permitting the musical instrument to be manipulated or played separate from the color lights, as before the attachment.

I may in some instances arrange a system of plain flat surface mirrors above or below the color bulbs at proper angles or inclination and may duplicate or triplicate them, so as to intensify the light effect, and thus increase the power of these varicolored lights. Also, if desired, similar mirrors can be placed at proper angles on either or both sides of the color bulbs, so as to further heighten the effect. In other instances I may place behind a bank of any of the series of seven colors a concave mirror, so as to gather the rays of light streaming from seven lighted-up bulbs by reflection on the concave mirror into a focus thrown upon a suitable screen so placed as to receive it, so that these seven colors may be blended into one upon the screen, place another concave mirror of proper size and shape to collect the rays of light from any six lighted-up bulbs, another from any five bulbs, or four or three or two bulbs, so that they shall be focused on a screen to the end that new tints and blends of colors may be produced, to be used by decorators, dyers, artists, and others.

The key mechanism is placed on sixty keys, each key connected with sixty cylinders, these cylinders comprising five banks of twelve each, and each bank containing seven whole notes and five sharps. The sharps are made by blending the two adjacent colors—C-sharp by blending red and orange, D-sharp by blending orange and yellow, (E has no sharp,) F-sharp by blending green and blue, G-sharp by blending blue and indigo, and A-sharp by blending indigo and violet. (B has no sharp.) These colors are thrown by incandescent electric lamps.

I claim—

1. The herein-described chromoscope, comprising a normally open electrical circuit arranged adjacent to the keys of musical device, suitable illuminating means disposed at intervals along said circuit, and means whereby said circuit is closed whenever the instrument-keys are operated, substantially as specified.

2. The herein-described chromoscope for musical instruments, comprising an electrical circuit which circuit is normally open and is adjacent to the keys of the musical instrument, connections leading from said circuit to the instrument-keys, and means whereby said circuit is closed whenever the instrument-keys are manipulated, substantially as specified.

3. A device of the class described comprising a suitable musical instrument having keys, a normally open electrical circuit adjacent to the keys of said instrument, rods resting upon said keys, means for operating said rods whenever the instrument-keys are depressed, and means whereby the circuit is closed when said rods are operated, substantially as specified.

4. A chromoscope, comprising a suitable musical instrument having keys, an electrical circuit which circuit is normally open, suitable illuminating-bulbs disposed at intervals along said circuit, a plurality of rods, means for operating said rods whenever the instrument-keys are depressed, and means whereby an illumination is effected when the said rods are operated, substantially as specified.

5. A chromoscope, comprising a normally open electrical circuit arranged within a musical instrument having keys, means whereby said circuit is closed by the depression of the instrument-keys, and means whereby an illumination is effected when the said keys are operated, substantially as specified.

6. An apparatus constructed to exhibit the primary colors and their blends twelve in number and known as the diachromatic scale, and the primary musical tones and their sharps twelve in number, known as the diatonic scale, connected by means of electrical conductors for the purpose described.

7. A musical instrument, having keys and suitable electrical connections whereby the primary colors may be exhibited synchronously with the operation of the primary keys, substantially as specified.

8. A musical instrument, having keys and means for exhibiting the diachromatic scale whenever the keys are operated to produce music, the members of the diachromatic scale being arranged in sequence according to their waves or undulations and being connected to the corresponding key of the diatonic scale, substantially as specified.

In testimony whereof I affix my signature in presence of witnesses.

JAMES M. LORING.

Witnesses:
H. T. LORING,
CHAS. O. MCINTYRE,
JOHN C. HIGDON.